(12) United States Patent
Maurer (10) Patent No.: US 9,212,499 B1
(45) Date of Patent: Dec. 15, 2015

(54) SKID MOUNTED UTILITY SYSTEM

(71) Applicant: Teton Energy Consulting, LLC, Aztec, NM (US)

(72) Inventor: Robert L. Maurer, Aztec, NM (US)

(73) Assignee: Teton Energy Consulting, LLC, Aztec, NM (US)

( * ) Notice: Subject to any disclaimer, the term of this patent is extended or adjusted under 35 U.S.C. 154(b) by 0 days.

(21) Appl. No.: 14/313,341

(22) Filed: Jun. 24, 2014

Related U.S. Application Data

(60) Provisional application No. 61/838,710, filed on Jun. 24, 2013.

(51) Int. Cl.
*E04H 1/12* (2006.01)
*E04B 1/343* (2006.01)
*H02B 1/52* (2006.01)
*E04H 5/04* (2006.01)
*E04H 1/00* (2006.01)
*H02B 7/06* (2006.01)

(52) U.S. Cl.
CPC *E04H 5/04* (2013.01); *E04B 1/343* (2013.01); *E04H 1/005* (2013.01); *E04H 1/12* (2013.01); *E04H 1/1205* (2013.01); *H02B 1/52* (2013.01); *H02B 7/06* (2013.01); *E04H 2001/1283* (2013.01)

(58) Field of Classification Search
CPC ........... E04H 5/04; E04H 1/12; E04H 1/1205; E04H 1/005; E04H 2001/1283; E04B 1/343; H02B 1/52; H02B 7/06
USPC ......................................................... 52/79.1
See application file for complete search history.

(56) References Cited

U.S. PATENT DOCUMENTS

| 5,121,600 | A | 6/1992 | Sanders et al. | |
|---|---|---|---|---|
| 6,016,634 | A * | 1/2000 | Sayer | 52/648.1 |
| 6,586,697 | B1 | 7/2003 | Enns | |
| 7,276,662 | B2 * | 10/2007 | Drane | 174/66 |
| 7,608,934 | B1 | 10/2009 | Hunter | |
| 7,793,467 | B1 * | 9/2010 | Melton et al. | 52/79.1 |
| 8,291,647 | B2 * | 10/2012 | Esposito | 52/66 |
| 8,308,417 | B1 * | 11/2012 | Verrochi | 414/467 |
| 8,368,611 | B2 * | 2/2013 | King et al. | 343/872 |

(Continued)

FOREIGN PATENT DOCUMENTS

CN 2018802090 4/2011

OTHER PUBLICATIONS

Transformer Maintenance, US Department of the Interior, Oct. 2000.*

*Primary Examiner* — Andrew J Triggs
(74) *Attorney, Agent, or Firm* — Lewis Roca Rothgerber LLP (57) ABSTRACT

The present invention is an enclosed and transportable skid mounted utility apparatus. The apparatus includes an enclosure disposed on a transportable skid. The enclosure has a floor, end and side walls and a roof. The enclosure also includes one or more generator assemblies. The one or more generator assemblies provide power to one or more breaker boxes located in the enclosure. The one or more breaker boxes transfer the power to one or more transformers located on a wall of the enclosure. The one or more transformers transform and transfer the power to an electrical distribution panel in the enclosure. A water tank is also disposed in the enclosure. A water manifold is coupled to the water tank, and the water manifold includes a pump that uses power generated from the one or more generator assemblies.

17 Claims, 5 Drawing Sheets

(56) References Cited

U.S. PATENT DOCUMENTS

| | | | |
|---|---|---|---|
| 8,415,829 B2* | 4/2013 | Di Cristofaro | 307/39 |
| 8,872,361 B2* | 10/2014 | Janscha et al. | 290/1 A |
| 2006/0080971 A1 | 4/2006 | Smith et al. | |
| 2006/0231282 A1* | 10/2006 | Greenfield | 174/67 |
| 2009/0015021 A1* | 1/2009 | Towada | 290/1 A |
| 2009/0205266 A1* | 8/2009 | Fennell | 52/79.1 |
| 2010/0251629 A1* | 10/2010 | Clidaras et al. | 52/79.1 |
| 2011/0301770 A1 | 12/2011 | Rutman | |
| 2013/0014451 A1* | 1/2013 | Russell et al. | 52/79.1 |

* cited by examiner

SKID MOUNTED UTILITY SYSTEM

CROSS-REFERENCE TO RELATED APPLICATIONS

This application claims the priority benefit of U.S. provisional application No. 61/838,710, entitled "Skid Mounted Utility System," filed on Jun. 24, 2013, the disclosure of which is incorporated herein by reference.

BACKGROUND OF THE INVENTION

1. Field of the Invention (Technical Field)

Embodiments of the present invention relate to a skid mounted utility system and more particularly to a transportable multi-component skid mounted utility system for oil and gas operations or emergency relief sites or back-up systems.

2. Description of Related Art

When drilling in earth formations for oil or gas, several utilities are used at the drilling site. Typically, a power generator, water tank and electrical supply are all used at the drilling site. This equipment is conventionally supplied at the drilling site by different contractors resulting in several large assemblies at the drill site. A drilling company typically licenses different assemblies and equipment from various contractors.

In addition, remote utilities, including power and water, are often needed at emergency relief sites after a natural disaster or whenever power and water are not available. There is a need in the industry for an all-in-one skid mounted utility apparatus that provides all of the equipment and utilities needed at a remote site.

SUMMARY OF THE CLAIMED INVENTION

An embodiment of the present invention is a skid mounted utility apparatus. The apparatus includes an enclosure disposed on a transportable skid. The enclosure includes a floor, end and side walls and a roof. One or more generator assemblies are disposed in the enclosure. The one or more generator assemblies provide power to one or more breaker boxes and the one or more breaker boxes transfer the power to one or more transformers. The transformers transform and transfer the power to an electrical distribution panel for power distribution. A water tank is also disposed in the enclosure, and a water manifold is coupled to the water tank. The water manifold includes a pump that uses power generated from the one or more generator assemblies.

The enclosure may be WiFi enabled and may include a turn-table mechanism disposed on the roof of the enclosure. A satellite system may be disposed on the turn-table mechanism. The electrical distribution panel may be a sloped female electrical receptacle distribution panel having staggered receptacles disposed along a panel. The enclosure may include a water communications box displaying a water level of the water tank. The enclosure may also include a heater and can also include a fire reel. The enclosure may also have one or more transformer enclosures, each of the one or more transformer enclosures having a transformer. Vents may disposed at a top of the one or more transformer enclosures and one or more air filters may be inside the transformer enclosures. The generator assemblies can be housed in a first room that is adjacent to a second room having the electrical distribution panel and the one or more breaker boxes, and the water manifold is housed in a third room that is adjacent to a fourth room having the water tank. The enclosure includes one or more electrical cord doors that can be accessed from the exterior of the enclosure. The enclosure includes a non-conductive rubber coating floor. The water manifold includes a container having one or more valves. The enclosure includes LED lighting and/or solar powered lighting.

BRIEF DESCRIPTION OF THE SEVERAL VIEWS OF THE DRAWINGS

The drawings, which are incorporated herein, illustrate one or more embodiments of the present invention, thus helping to better explain one or more aspects of the one or more embodiments. As such, the drawings are not to be construed as limiting any particular aspect of any embodiment of the invention. In the drawings.

DETAILED DESCRIPTION OF THE INVENTION

One embodiment of the present invention includes a skid mounted utility system, preferably a transportable, fully enclosed, multi-functional skid mounted utility apparatus. The utility apparatus includes at least one generator assembly, a water tank, an electrical room, solar powered lighting, is Wi-Fi capable and is housed in a fully enclosed building and disposed on a transportable skid. The skid mounted utility apparatus is enclosed to protect the equipment and components from outdoor elements and harsh weather as well as to keep the equipment and components clean. The utility apparatus is divided into multiple sections or rooms. For example, there is a room for the one or more generator assemblies, a room for a water tank, a room for a water manifold and an electrical control room.

Embodiments of the present invention include an enclosed and transportable skid mounted utility apparatus. The apparatus includes an enclosure disposed on a transportable skid. The enclosure has a floor, end and side walls and a roof. The enclosure also includes one or more generator assemblies. The one or more generator assemblies provide power to one or more breaker boxes located in the enclosure. The one or more breaker boxes transfer the power to one or more transformers located on a wall of the enclosure. The one or more transformers transform and transfer the power to an electrical distribution panel in the enclosure. The electrical distribution panel is used to distribute power. A water tank is also disposed in the enclosure. A water manifold is coupled to the water tank, and the water manifold includes a pump that uses power generated from the one or more generator assemblies.

Figure 1:
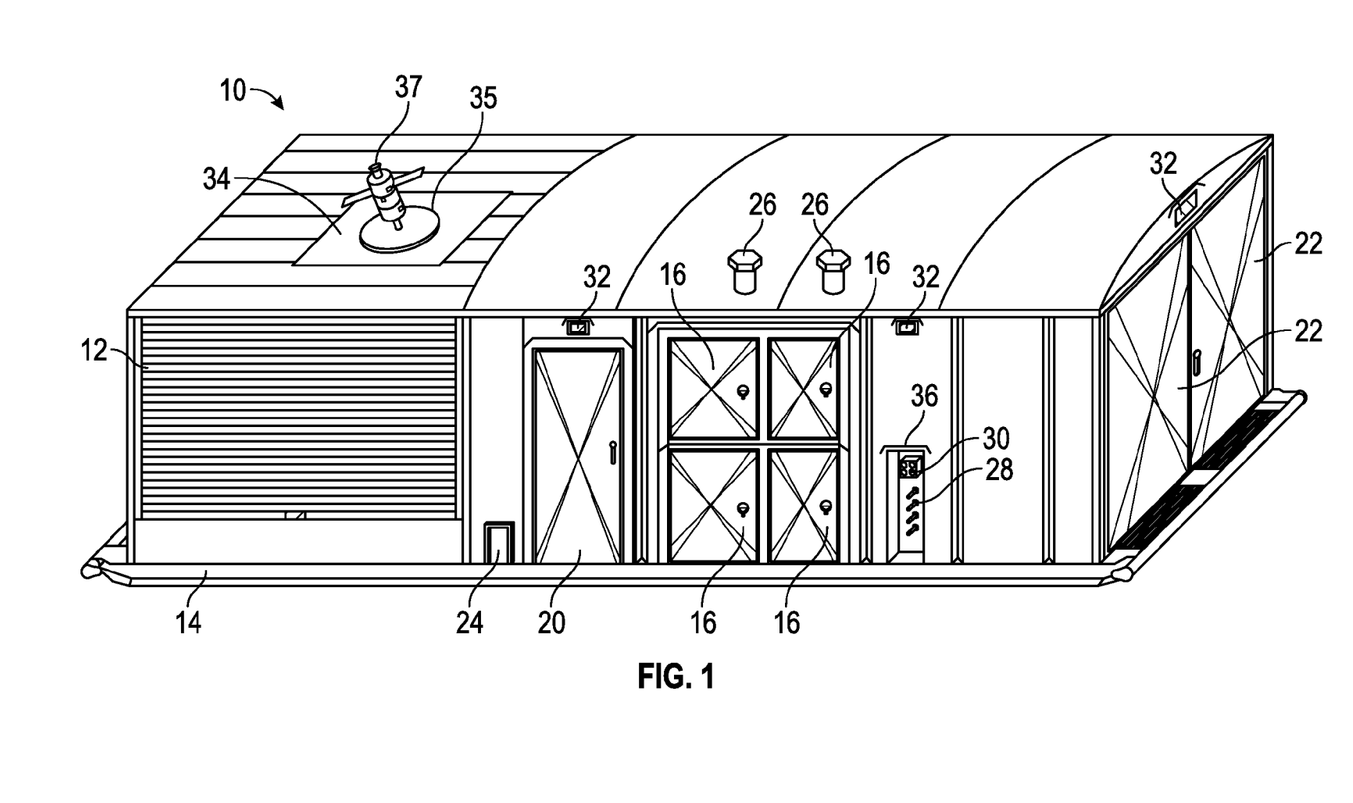
FIG. 1 is a drawing of a front view of a utility skid mounted apparatus of one embodiment of the present invention.
Figure 2:
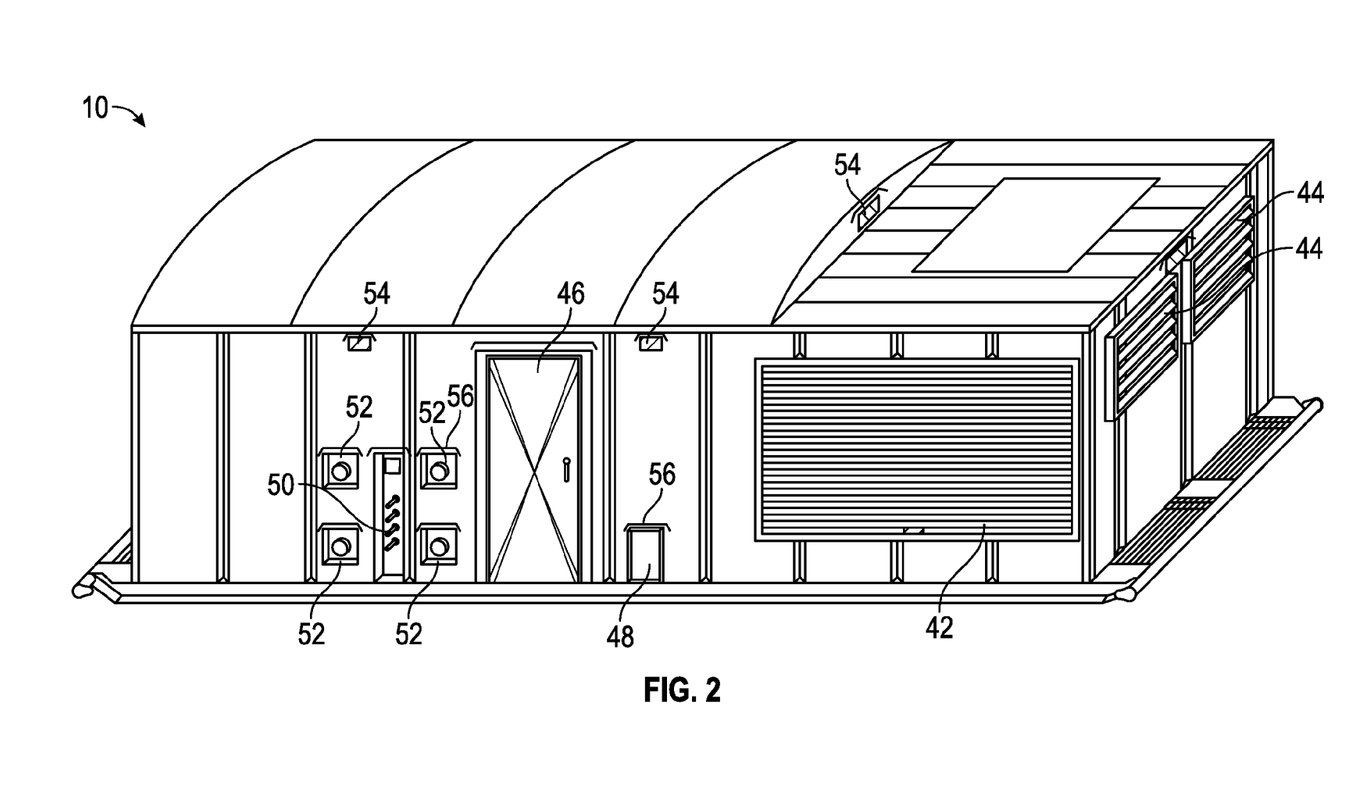
FIG. 2 is a drawing of a back view of a utility skid mounted apparatus of one embodiment of the present invention.

Referring to FIG. 1, a front view of utility apparatus 10 includes rolling door 12, platform 14, transformer enclosures 16, entry door 20, side doors 22, electrical cord door 24, transformer vents 26, exterior valves 28, electrical outlets 30, room vents 32, roof platform 34, and weather shield 36. Referring to FIG. 2, a back view of apparatus 10 includes rolling door 42, side vents 44, entry door 46, electrical cord door 48, exterior water valves 50, lights 52, room vents 54, weather shields 56. Lights 52 are used to illuminate water valves 50.

Figure 3:
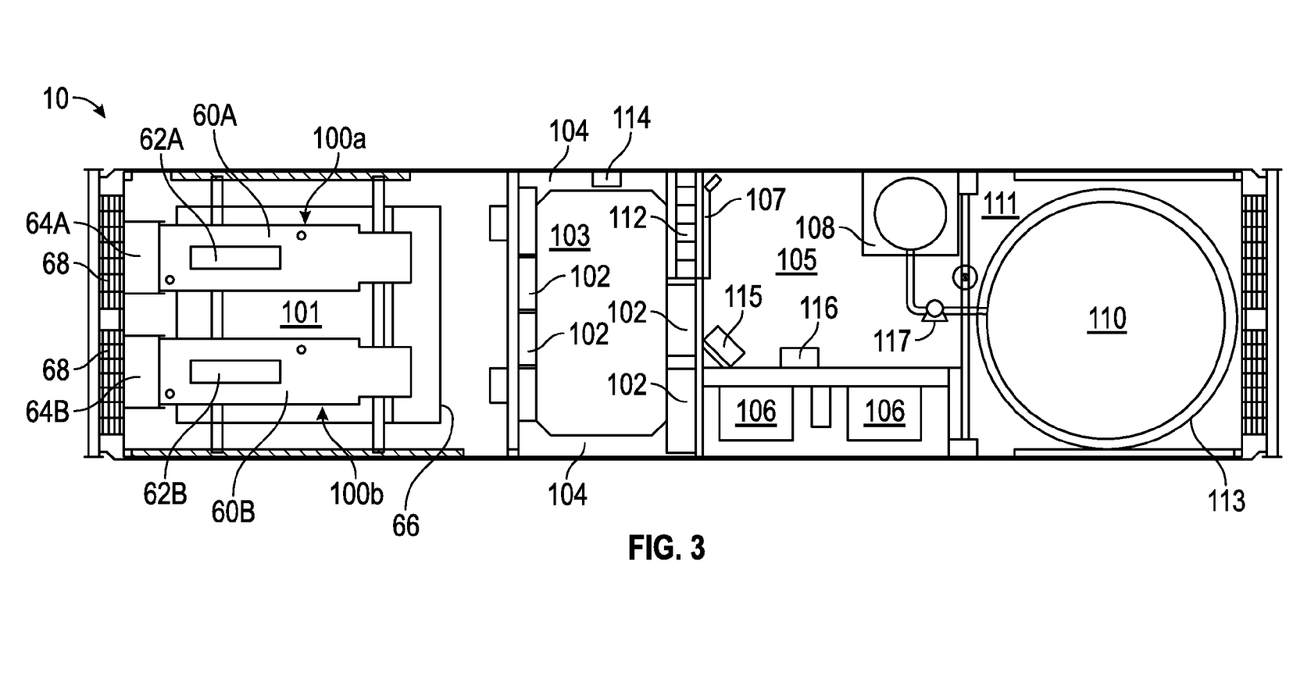
FIG. 3 is a drawing of a floor plan view of a utility skid mounted apparatus of one embodiment of the present invention.

An example floor plan of a utility skid mounted apparatus is shown in FIG. 3. In this example, apparatus 10 includes generator assemblies 100A and 100B in room 101, electrical boxes 102 and continuous wireway 104 in electrical control room 103, transformers 106 in separate enclosures, water manifold 108 and fire reel 116 in water room 105 and water tank 110 in water tank room 111.

All exterior doors on the skid mounted utility apparatus are insulated and there are exterior lights located around the enclosure (not shown). The skid floor is preferably coated with a non-conductive rubber coating.

Generator Assemblies

Room 101 is preferably equipped with Wi-Fi and houses generator assemblies 100A and 100B. The power used by apparatus 10 is generated by generator assemblies 100A and 100B, including the power and energy used by the lighting, heating and cooling of apparatus 10. The flooring in the room 101 is a no slip floor with carbon slots. Room 101 is fully enclosed and the roof of room 101 has a 360 degree, rotator or turn-table type device 35 disposed on roof platform 34 to set satellite system 37. There is preferably a motor located in room 101 that controls turntable 35. Satellite system 37 can be used to communicate with corporate offices and/or upload or uplink drilling data. The roof can hold at least about 2300-2500 pounds.

Room 101 preferably has a rolling or garage type door and a filtered ventilation system on either side of the rolling door. There are preferably one or more openings between room 101 and room 103 that allow air circulation through room 101. The filtered ventilation system filters air coming into room 101. There may also be louvers to control the air output from radiators 64A and 64B of motors 62A and 62B. The louvers also prevent dust from blowing into radiators 64A and 64B on the front of the skid at radiator fan 68. Room 101 may also have motion detector lighting.

Generator assemblies 100A and 100B include generators 60A and 60B coupled to motors 62A and 62B and radiator systems 64A and 64B. Fuel tank 66 is used for fueling generator assemblies 100A and 100B. Generator assemblies 100A and 100B are disposed above the ground on a support and have forklift openings for generator assembly removal. The support preferably includes steel braces and mounts. The support elevates generator assemblies 100A and 100B above fuel tank 66 that is located under generator assemblies 100A and 100B.

Motors 62A and 62B of generator assemblies 100A and 100B preferably use fuel from fuel tank 66. Motors 62A and 62B filter spent fuel using a plurality of filters that are disposed on the motors and below radiators 64A and 64B. Motors 62A and 62B also include an outlet for optional computer monitoring. Motors 62A and 62B preferably meet EPA Tier 4 Emissions standards.

Radiator systems 64A and 64B on each generator assembly 100A and 100B are preferably dual radiator systems with air discharge. Mufflers are located above radiator motors and the vented air goes out with the radiator air discharge. The mufflers are preferably hospital grade.

Room 101 may also include radiator fan 68. Radiator fan 68 is part of the radiator motor, and circulates water and blows air to cool the radiator motors. It is located near the radiator motors.

Fuel tank 66 holds diesel fuel and has a sloping bottom to catch debris. The sloping bottom slopes down to a trough to catch and hold debris. Inside the trough is a fuel discharge clean out used to clean the debris from the trough in fuel tank 66. Fuel tank 66 preferably includes a sonic reading gauge to sense depth and amount of fuel in fuel tank 66. Fuel tank 66 includes vents, inlets and outlets and can hold up to about 250 gallons of diesel fuel. Fuel tank 66 also has baffles to prevent fuel from sloshing. There is alternatively a heating system that includes an electric circulating system that creates heat using a heating element inside fuel tank 66 to prevent gelling of the fuel.

There are steps on the side of generator assemblies 100A and 100B for easy access to generator assemblies 100A and 100B. The steps are on a hinge that is mounted on one of the motor supports to allow the steps to fold in and out for safety.

In one embodiment, room 101 includes two fuel tanks, one that holds diesel fuel and the other that supplies flex fuel to meet EPA Tier 4 Emissions standards.

Electrical Control

Electrical control room 103 houses an electrical distribution panel, such as panel 112, and one or more breaker boxes 102. Electrical control room 103 also includes a switch gear that indicates which of generator assemblies 100A and 100B is running. Continuous wireway 104 feeds to each breaker box 102 that is positioned along a wall. Wireway 104 is a trough that is lined with sheet metal and preferably has hinged covers or doors. Wireway 104 houses all wires and electrical sources. Wireway 104 includes one or more access doors for a user to access electrical wires and cords. The access doors preferably include locking clasps and heavy duty hinges.

Figure 4:
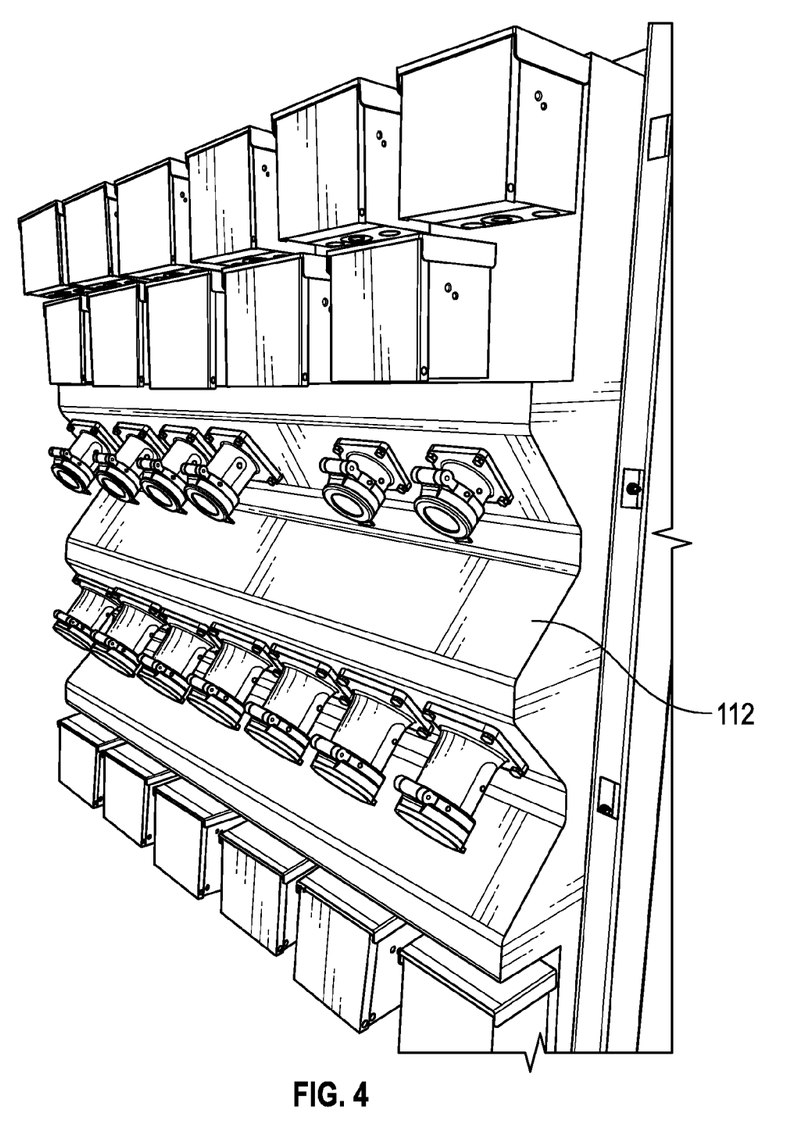
FIG. 4 is a drawing of a front view of a female electrical receptacle distribution panel of one embodiment of the present invention.
Figure 5:
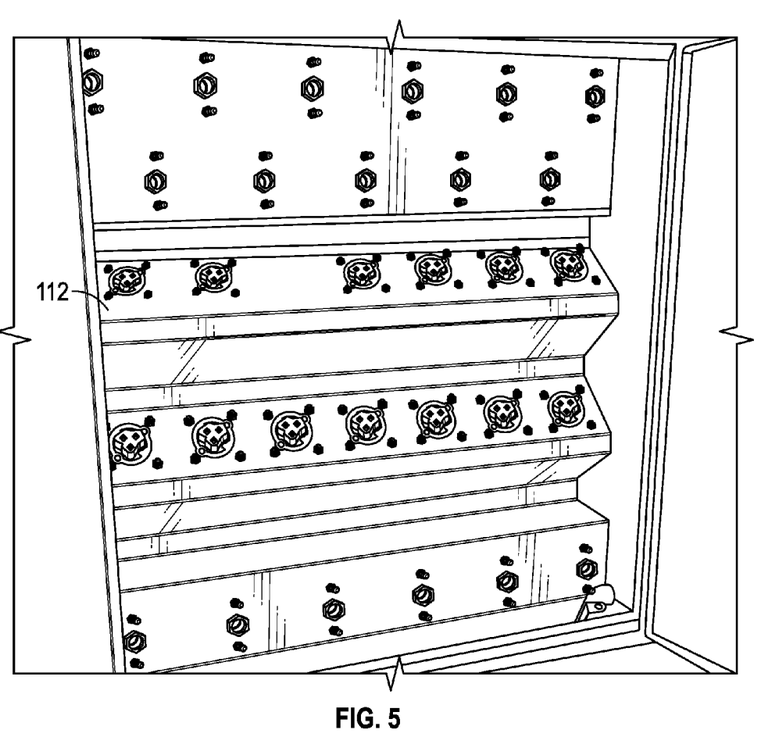
FIG. 5 is a drawing of a back view of a female electrical receptacle distribution panel of one embodiment of the present invention.

Referring to FIGS. 4 and 5, room 103 can also include female electrical receptacle distribution panel 112 that is ergonomically designed with staggered receptacles disposed along panel 112 for easy plug-in and maximum cord flow and placement. The female receptacles are preferably installed at an angle, preferably a downward sloped angle for easier access to the receptacles. The receptacles are mounted in a staggered position on panel 112 for easier use of the receptacles and to ensure a long receptacle life. The back side of panel 112 is also fully accessible by a user via service door 107 in water room 105.

Water communications box 114 is housed in an enclosure in room 103. Water communication box 114 displays a water level in water tank 110, and preferably displays the water level as depth in feet.

Electrical control room 103 has one or more cord entry doors 24 and/or 48 located along the bottom of one or more exterior walls (similar to doggies doors) that are designed to receive male electrical cords. Cord entry doors 24 and 48 have a safety locking system that is spring loaded as well as a handle for a user to pull the door open and push shut.

Electrical control room 103 has LED lighting as well as a back-up solar powered light that is operated on a motion sensor. The LED light may also be operated on a motion sensor or may just use a switch.

Transformers

Transformers 106 are installed along a side wall of utility apparatus 10. Transformers 106 are located in transformer enclosures 16 (see FIG. 1) and include shock absorbing pads along the bottoms of enclosures 16. Transformer enclosures 16 preferably include a door with spring hinges and a lock to secure transformers 106. All wires to transformers 106 are fed through a wireway into transformer enclosures 16. Enclosures 16 also includes one or more vents and a filtration system to keep the air clean. Vents 26 at the top of transformer enclosures 16 pull hot air up and out via a fan with a motor. Filters are located at the bottom of transformer enclosures 16 and filter fresh air from the outside. The filters keep out dust and dirt from transformer enclosures 16 and filter the air throughout enclosures 16. Transformer enclosures 16 pull air out through vents 26 (see FIG. 1) that include a main vent and a back-up vent. The doors are all lockable and sealable.

Water Manifold System

Water room 105 includes water manifold system 108 that delivers water to exterior water valves 28 (see FIG. 1) and 50 (see FIG. 2). Water manifold system 108 is preferably located in room 105. Water manifold system 108 includes container 109, preferably a cylindrical container, that is mounted substantially vertically with valves on each side of container 109. There may be four valves on each side of container 109. These valves can be connected to exterior valves 28 and 50 using hoses. Water is delivered to the bottom of container 109 from water tank 110. The water fills and pressurizes container 109 to ensure equal distribution of water through the valves. A valve at a bottom of 109 may also act as a drain. All connections on manifold 108 are frost free stainless steel. Manifold 108 can have heat trace and heat blankets to prevent freezing. Hoses that are removably attachable to manifold 108 via the valves are preferably rated at about 50 to about 150 psi and more preferably about 100 psi. Manifold 108 preferably has one or more swivel quick change connectors for easy repairs and replacements of the valves and is self-draining through the drain valve on container 109.

To use water manifold system 108, water is pumped from water tank 110 using pump 117 or a pressure tank. Hoses and standard fittings are used to transport the water from tank 110 through manifold system 108 to exterior valves 28 and/or 50 located outside the skid. The water exits tank 110 and is pumped through container 109 and out one or more open valves disposed on container 109 and to one or more open exterior valves 28 and/or 50. Exterior valves are preferably installed substantially vertically with a heat trace. Exterior valves 28 and 50 are heated and covered using removable covers 36 (see FIG. 1) and 56 (see FIG. 2) for weather protection.

Water room 105 has service door 107 that is preferably a lock out tag out door. Service door 107 allows for easy access for service and plug replacement of the back side of female electrical receptacle distribution panel 112.

In one embodiment of the present invention, water manifold system 108 includes a variable speed drive that controls the pressure of the water in manifold 108 to accommodate the demand for water. The variable speed drive saves power and pump life as it detects a need of pressure from a user and allows pump 117 to work as demanded versus merely on or off modes. For example, if eight valves are opened at the same time, pump 117 works harder than if only one valve is opened for retrieving water.

Water Tank

Room 111 of skid 10 preferably houses water tank 110. Water tank 110 is positioned and optionally centered onto foundation 113 and secured by a cable and ratchet straps. Foundation 113 can be round, square or any other shape that corresponds to the shape of water tank 110. Water tank 110 is vented and preferably holds potable water. A depth sensor, preferably a sonic water depth sensor with an alarm system for low water level, is disposed on water tank 110. The display of the depth sensor is located in electrical control room 103 at water communications box 114. The piping from water tank 110 to water manifold 108 goes through the wall that divides water room 105 from water tank room 111.

Lighting

There is preferably LED lighting as well as a solar lighting back up system throughout utility apparatus 10.

Climate Control/Heater

Heater 115 in water room 105 is used to control the climate in the room, particularly during the winter months.

Fire Reel

Utility skid mounted apparatus 10 of one embodiment includes fire reel 116. Fire reel 116 is preferably housed in water room 105. A fire hose is preferably housed around fire reel 116 and a motor on the reel retracts the hose after it has been unwound. To use the fire hose, a nozzle of the fire hose is preferably fed through an opening in an exterior wall. A roller bar assists with unwinding the fire hose. The hose is preferably unwound by hand and wound up automatically using the motor. A secondary hand crank is used in case of an electrical fire. Water is fed to the hose from the top of container 109 and through a valve located at the top of container 109.

Although the invention has been described in detail with particular reference to some embodiments, other embodiments can achieve the same or similar results. Upon studying this application, those skilled in the art will realize other equivalent variations and/or modifications that can also be used. It is intended that the claims contained in any patent issued on this application cover all such equivalents. The entire disclosures of all references, applications, patents, and publications cited above are hereby incorporated herein by reference.

What is claimed is:

1. A skid mounted utility apparatus comprising:
an enclosure disposed on a transportable skid, the enclosure including:
a floor, end and side walls, a roof, at least one entry door, and at least one rolling door;
one or more generator assemblies disposed in a first fully enclosed room of the enclosure, the one or more generator assemblies providing power to one or more breaker boxes located along a wall in a second room of the enclosure;
the one or more breaker boxes transferring the power to one or more transformers located along a side wall of the enclosure;
the one or more transformers transforming and transferring the power to an electrical distribution panel located against a wall in the second room of the enclosure;
a water tank disposed in a fourth room of the enclosure; and
a water manifold located in a third room of the enclosure and coupled to the water tank via piping from the water tank to the water manifold, the piping disposed through a substantially vertical wall that divides the fourth room from the third room, the water manifold including a pump that uses power generated from the one or more generator assemblies to deliver water to one or more exterior water valves located on an outside wall of the enclosure.

2. The apparatus of claim 1, further comprising a turn-table mechanism disposed on a roof of the enclosure.

3. The apparatus of claim 2, further comprising a satellite system disposed on the turn-table mechanism.

4. The apparatus of claim 1, wherein the electrical distribution panel is a sloped female electrical receptacle distribution panel having staggered receptacles disposed along a panel.

5. The apparatus of claim 1, further comprising a water communications box displaying a water level of the water tank.

6. The apparatus of claim 1, further comprising a wireway that feeds the one or more breaker boxes.

7. The apparatus of claim 6, further comprising vents disposed at a top of the one or more transformer enclosures.

8. The apparatus of claim 6, wherein the one or more transformer enclosures include one or more air filters.

9. The apparatus of claim 1, wherein the water tank is disposed in a foundation.

10. The apparatus of claim 1, further comprising a fuel tank having a sloped bottom, wherein the fuel tank is coupled to the one or more generator assemblies.

11. The apparatus of claim 1, wherein the enclosure includes a fire hose reel.

12. The apparatus of claim 1, further comprising one or more electrical cord doors disposed in one of the side walls for coupling one or more exterior devices to the electrical distribution panel.

13. The apparatus of claim 1, wherein the enclosure includes a non-conductive rubber coating floor.

14. The apparatus of claim 1, wherein the water manifold includes a container having one or more valves.

15. The apparatus of claim 1, wherein the enclosure includes LED lighting.

16. The apparatus of claim 1, wherein the enclosure includes solar powered lighting.

17. The apparatus of claim 1 further comprising a service door installed between the second room and the third room for access to a backside of the electrical distribution panel.

\* \* \* \* \*